United States Patent
Assmann

(10) Patent No.: US 8,157,079 B2
(45) Date of Patent: Apr. 17, 2012

(54) TRANSPORTING APPARATUS FOR A VEHICLE ASSEMBLY PLANT

(75) Inventor: Roland Heinz Assmann, Büdingen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/846,727

(22) Filed: Jul. 29, 2010

(65) Prior Publication Data

US 2011/0067979 A1    Mar. 24, 2011

(30) Foreign Application Priority Data

Sep. 21, 2009   (EP) .................................... 09011977

(51) Int. Cl.
*B65G 15/64*    (2006.01)
(52) U.S. Cl. ................ 198/345.1; 198/345.3; 254/89 R
(58) Field of Classification Search ............. 198/345.1, 198/345.2, 345.3; 187/247; 254/45, 89 R; 414/564, 610, 611
See application file for complete search history.

(56) References Cited

U.S. PATENT DOCUMENTS

| 2,792,913 | A | * | 5/1957 | Capgras ...................... 254/89 R |
| 4,782,760 | A | * | 11/1988 | Rohrbach et al. .......... 198/345.3 |
| 4,867,296 | A | * | 9/1989 | Volna ......................... 198/345.3 |
| 4,898,268 | A | * | 2/1990 | Kamioka et al. ........... 198/345.1 |
| 5,170,876 | A | * | 12/1992 | Sticht ......................... 198/345.3 |
| 6,196,372 | B1 | * | 3/2001 | Rossi ......................... 198/345.1 |
| 7,461,733 | B2 | * | 12/2008 | Dohi ........................... 198/346.3 |
| 7,815,035 | B2 | * | 10/2010 | Suzuki et al. ............... 198/345.1 |
| 2003/0000413 | A1 | | 1/2003 | Arai et al. |
| 2009/0067962 | A1 | | 3/2009 | Lee |

FOREIGN PATENT DOCUMENTS

| EP | 1473258 | 11/2004 |
| JP | 6156662 | 6/1994 |

* cited by examiner

*Primary Examiner* — James R Bidwell
(74) *Attorney, Agent, or Firm* — Cozen O'Connor

(57) ABSTRACT

A transporting apparatus for a vehicle assembly plant having a base element that is displaceable on a transporting plane, at least two pedestal elements connected to the base element, where each pedestal element is rotatable about a rotational axis perpendicular to the transporting plane. In addition, a support element for holding a vehicle body is connected to each of the at least two pedestal elements, where the support element is moveable eccentrically with respect to the rotational axis of each pedestal element.

14 Claims, 4 Drawing Sheets

TRANSPORTING APPARATUS FOR A VEHICLE ASSEMBLY PLANT

BACKGROUND OF THE INVENTION

1. Field of the Invention

The invention relates to manufacturing equipment and, more particularly, to a transporting apparatus for vehicle assembly plants which extend, for example, along production lines.

2. Description of the Related Art

Assembly lines have been used for a long time (i.e., decades) in vehicle assembly plants to optimize manufacturing runs. Vehicles to be manufactured, i.e., motor cars, are transported from one workstation to the next. At each workstation, usually only a few, relatively simple working steps are performed. Conveying systems used for transporting vehicles in vehicle assembly plants must meet a large number of requirements. Firstly, the vehicles to be transported are relatively heavy as workpieces. Secondly, the vehicles have to be readily accessible to be worked on from as many sides as possible, i.e., for performing working steps ergonomically.

Usually, vehicles that are not completely assembled are transported in a vehicle assembly plant by overhead conveyors. Electric overhead conveyors are known and in wide use. DE 31 46 807 A1 discloses one such conveying system in which a motor vehicle body is suspended on supports for transport. Work, such as installing wiring or fixtures in the engine compartment, frequently occurs when the motor vehicle body is being transported by an overhead conveyor. In many cases, after a vehicle has been worked on as a suspended workpiece, the vehicle to be assembled must be transferred to a platform system on which the vehicle is transported. This usually occurs before or after the drive train and the vehicle body have been joined together as part of a "wedding". When the vehicle to be assembled is transported on the platform system, the vehicle is readily accessible for work, such as the adhesive bonding of glazing, or the installation of doors, cockpit or seats.

DE 10 2005 062 691 A1 describes another conveying system in an assembly plant for motor vehicles, where a moveable platform which comprises a lifting apparatus for a motor vehicle is provided for each motor vehicle. Here, the lifting apparatus is arranged in a vertical projection next to the motor vehicle. A moveable platform is provided for essentially any motor vehicle to be manufactured. The motor vehicle remains on the platform throughout the manufacturing sequence. As a result, complicated transferring of the motor vehicle from an overhead conveyor onto a platform system can be eliminated, thereby providing a manufacturing sequence that is less susceptible to interruptions.

SUMMARY OF THE INVENTION

It is an object of the present invention to provide a transporting apparatus for a vehicle assembly plant which enables improved accessibility to the vehicle body for workers in a vehicle assembly plant and ergonomic workflows.

This and other objects and advantages are achieved in accordance with the invention by a transporting apparatus for a vehicle assembly plant comprising a base element that can be displaced on a transporting plane. In accordance with the invention, at least two pedestal elements are connected to the base element which are each rotatable about a rotational axis perpendicular to the transporting plane. In addition, one support element for holding a vehicle body is provided for each pedestal element, where the one support element is connected to a pedestal element and is moveable eccentrically with respect to the rotational axis of the pedestal element. In preferred embodiments, each pedestal elements is connected to a lifting apparatus, where the support elements are moveable by the lifting apparatuses that are parallel to the rotational axes of the pedestal elements. Here, each lifting apparatuses may comprise a telescopic mechanism which can be extended individually.

In accordance with the disclosed embodiments, the support elements are moveable eccentrically with respect to the rotational axis of a respective pedestal element. Consequently, the support elements are positionable in different ways on a vehicle underbody to thereby support loads. In a first position, the support elements are positionable in an outer region of the vehicle underbody, as seen, for example, in the longitudinal direction of the vehicle, so that the drive train and the vehicle body can easily be connected together. Furthermore, in this position essentially all vehicle underbody regions, in which, for example, wiring is to be installed, are readily accessible. Correspondingly, the support elements are positionable, for example, in a second position in an inner region, so that the front and rear sides as well as the outside and the top side of the vehicle body are readily accessible, i.e., in low positions of the support elements. Overall, these positions and further possible positions of the support elements result in virtually unlimited accessibility to a motor vehicle body. In turn, it also becomes possible to achieve a continuous conveying technology concept, so that complicated processes for transferring a motor vehicle from an overhead conveyor onto a platform system can be eliminated. Furthermore, no space-consuming support structures for overhead conveyors are required in a vehicle assembly hall.

In accordance with an advantageous embodiment of the present invention, the pedestal elements are mounted on the base element and the support elements are secured in each case on a lifting apparatus. In further embodiments, the pedestal elements have a circular cross section, where each rotational axes of the pedestal elements extend centrally through the pedestal elements and the lifting apparatuses are secured off-center on a pedestal element. In alternative embodiments, the lifting apparatus is secured to the base element, where each pedestal element is mounted on a lifting apparatus. Here, each support element is arranged on a pedestal element and the rotational axis of each pedestal element extends off-center through the pedestal element. In certain embodiments, each support element is integrally formed on the pedestal element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail in the following by an exemplary embodiment and on the basis of the drawing, in which.

DETAILED DESCRIPTION OF THE PREFERRED EMBODIMENTS

Figure 1:
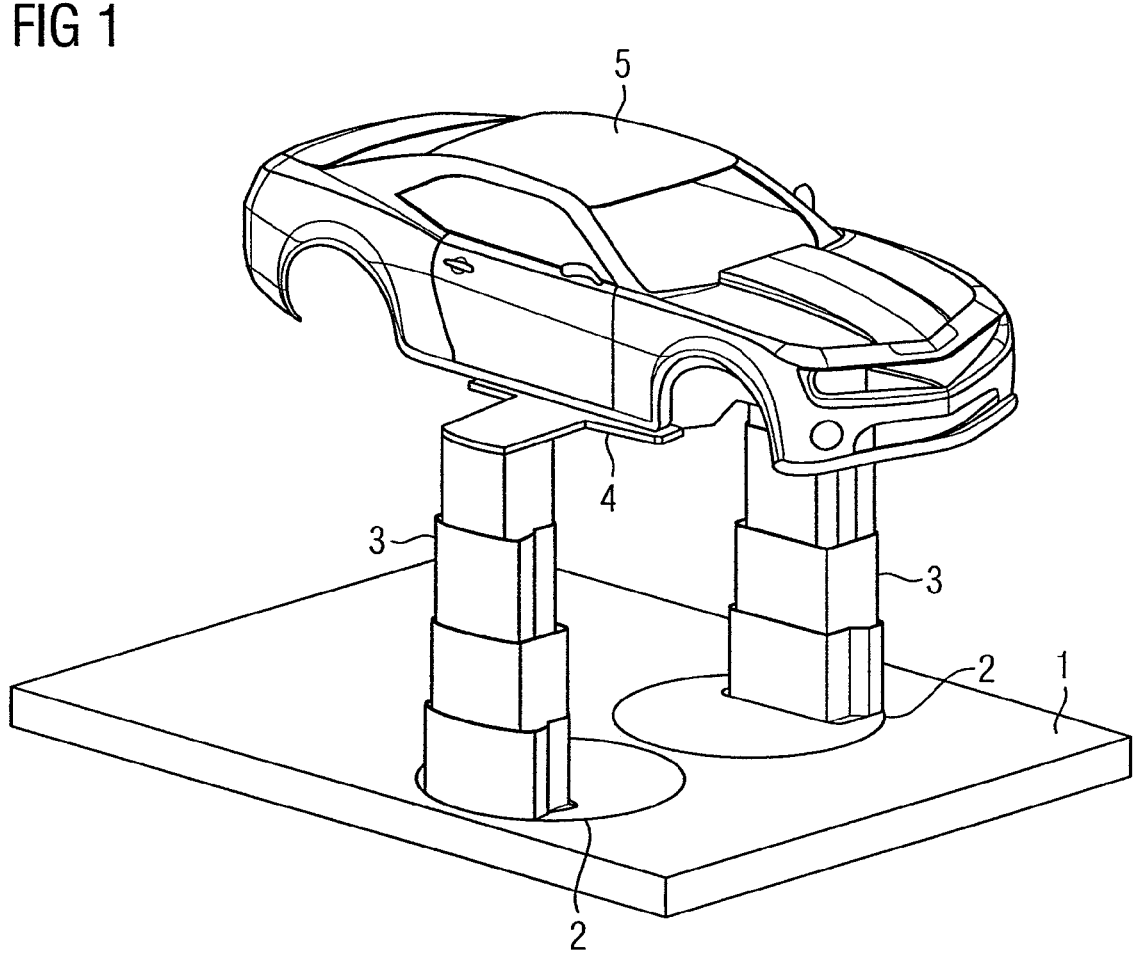
FIG. 1 is an illustration of a perspective view of a transporting apparatus for vehicle assembly in accordance with an embodiment of the invention.

The transporting apparatus illustrated in FIG. 1 comprises a base element 1 which can be displaced on a transporting plane. The base element 1 may, for example, be a vehicle that is steerable by remote control or a rail-guided vehicle. In the present exemplary embodiment, the transporting plane extends parallel to the base element 1. Mounted on the base element 1 are two pedestal elements 2, which are each rotatable about a rotational axis perpendicular to the transporting plane. Moreover, the pedestal elements 2 may be secured such that they can be displaced on the base element 1 in the longitudinal or transverse direction of the base element 1.

The pedestal elements 2 have a circular cross section, and the rotational axis of each pedestal element 2 extends in the present exemplary embodiment centrally through the pedestal element 2. A lifting apparatus 3 is secured off-center on each pedestal elements 2, which describes an eccentric curve when a respective pedestal element 2 is rotated. In each case, the lifting apparatuses 3 comprise a telescopic mechanism based on a spiral lifting unit, and is extendable individually to different heights, so that a vehicle 5 on the transporting apparatus can be tilted about its longitudinal axis.

Figure 2:
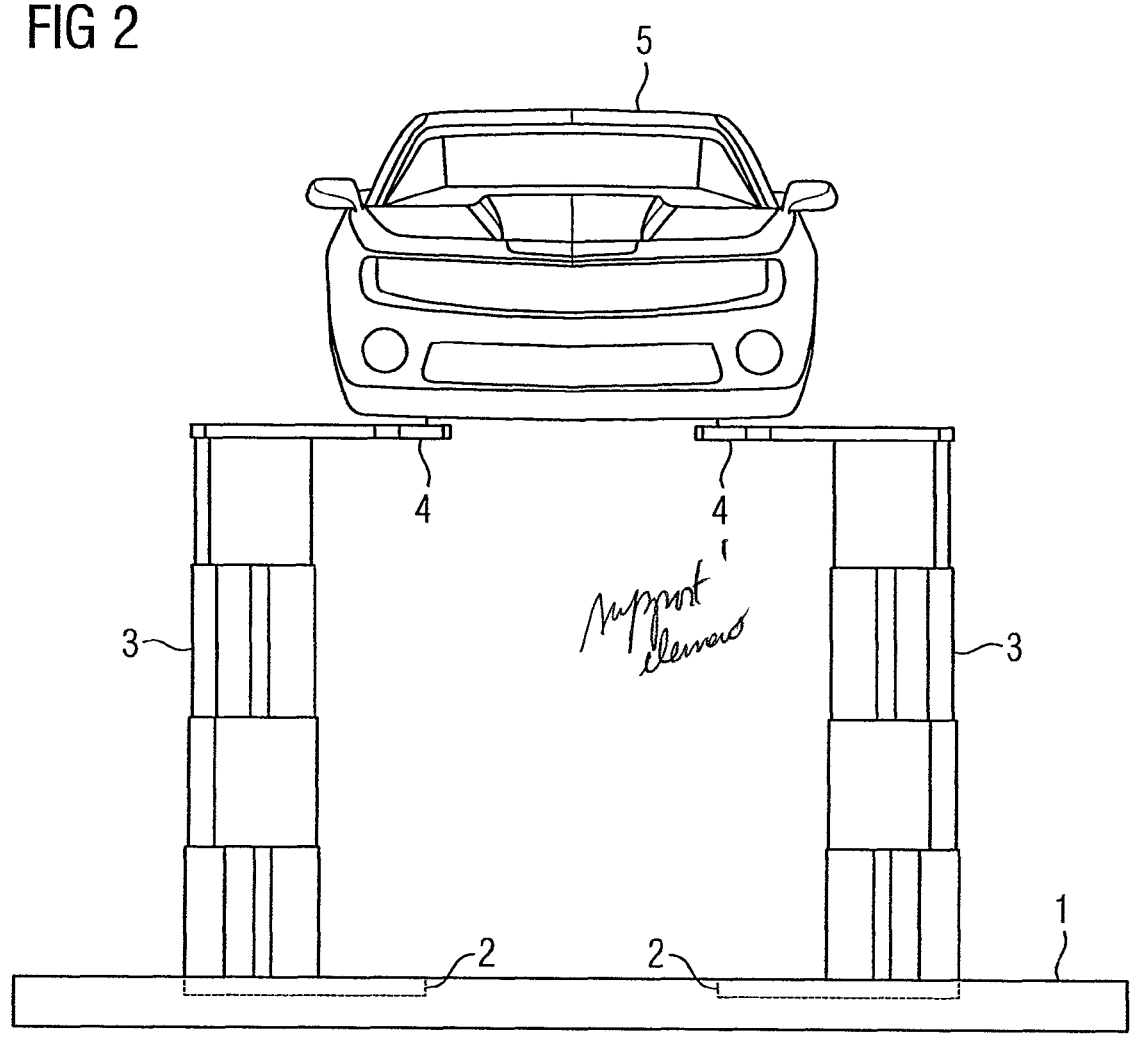
FIG. 2 is an illustration of the transporting apparatus shown in FIG. 1 when viewed from the front of a vehicle.

As seen from FIG. 2, in each case an exchangeable support element 4 for holding a vehicle 5 is secured on the lifting apparatuses 3, where the support element is moveable eccentrically with respect to the rotational axis of the respectively associated pedestal element. With the lifting apparatuses 3, the support elements 4 can be moved parallel to the rotational axes of the pedestal elements 2.

In a first position depicted in FIGS. 1 and 2, the support elements 4 have been positioned in an outer region on the vehicle underbody, as seen in the longitudinal direction of the vehicle, by rotating the pedestal elements 2. In this position, the spacing between the lifting apparatuses 3 is at a maximum. Furthermore, in the position corresponding to FIGS. 1 and 2, the lifting apparatuses 3 have been extended to a maximum height, so that, for example, the drive train and body of a vehicle 5 can easily be connected together.

Figure 3:
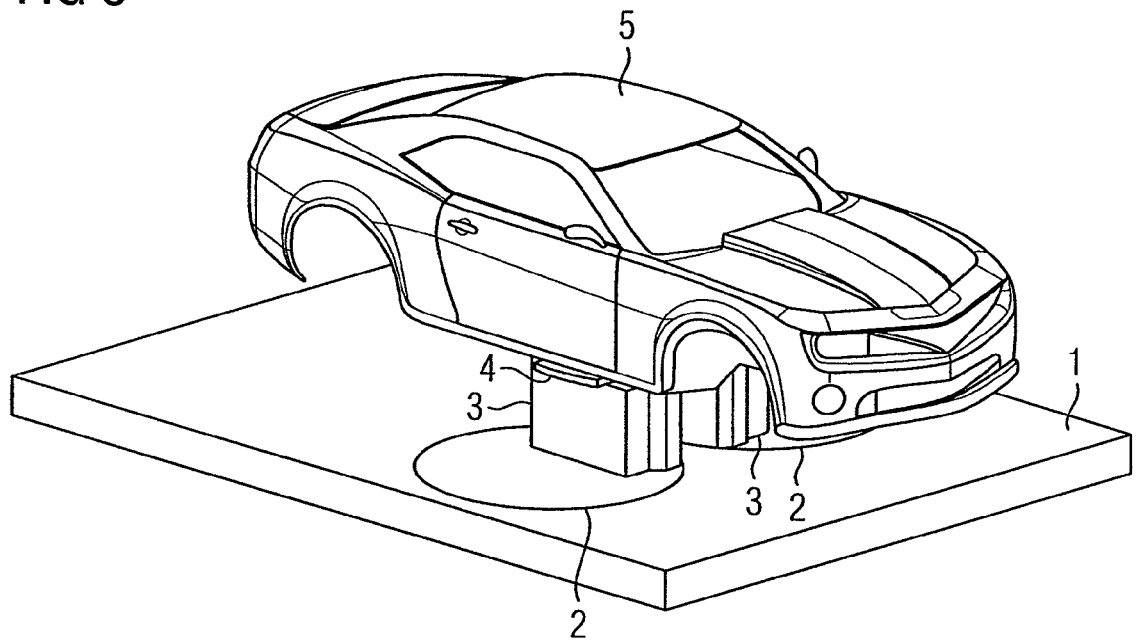
FIG. 3 is an illustration of the transporting apparatus shown in FIG. 1 having support elements in an altered position.
Figure 4:
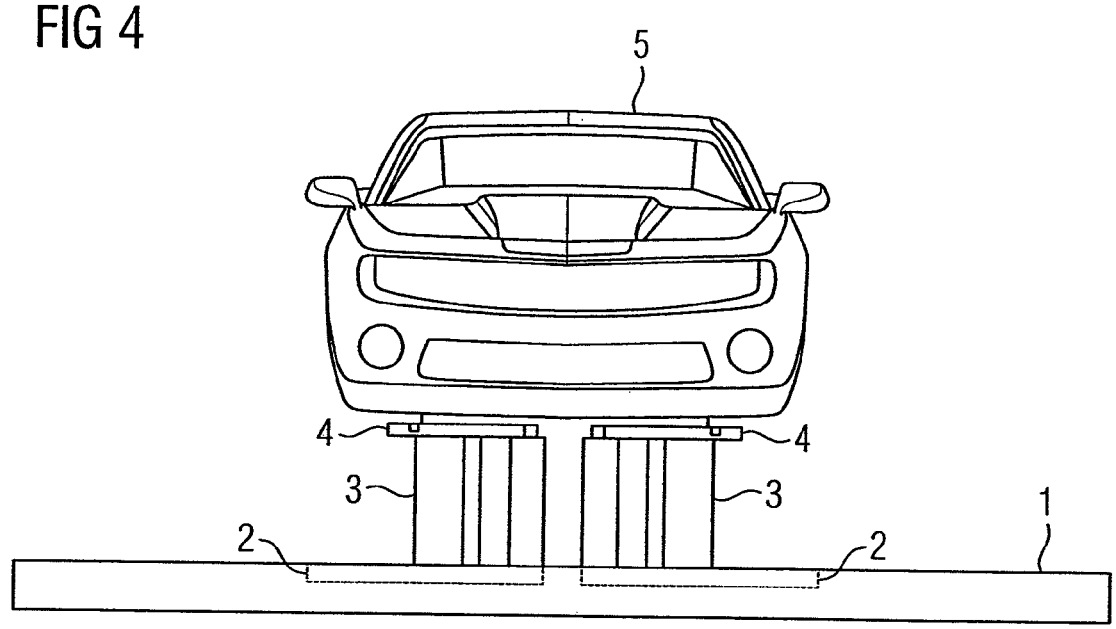
FIG. 4 is an illustration of the transporting apparatus shown in FIG. 3 when viewed from the front of the vehicle.

In accordance with a second position, which is depicted in FIGS. 3 and 4 from at viewing angles, the support elements 4 have been positioned in an inner region of the vehicle underbody. In this position, the spacing between the lifting apparatuses 3 is at a minimum. Furthermore, in the position depicted in FIGS. 3 and 4, the lifting apparatuses 3 have been retracted to a minimum height, so that, for example, the vehicle 5 is readily accessible for work, such as for adhesive bonding of glazing, or installing doors, a cockpit or seats of the vehicle.

Figure 5:
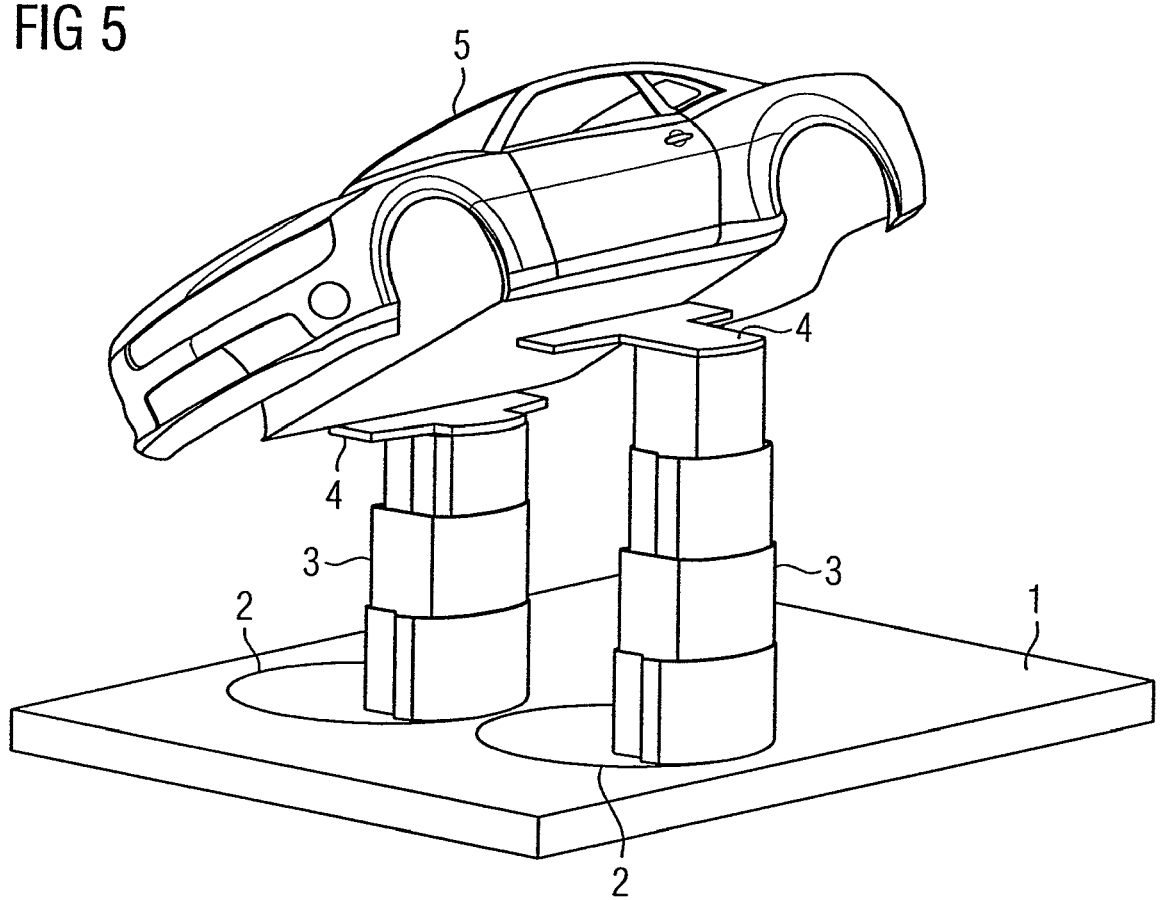
FIG. 5 is an illustration of the transporting apparatus shown in FIG. 1 having support elements and lifting apparatuses in altered positions.

FIG. 5 shows a further position of lifting apparatuses 3 and support elements 4. Here, the lifting apparatuses have been extended to different heights. As for the support elements 4, one has been pivoted into the outer region and one has been pivoted into the inner region of the vehicle underbody. As a result, the vehicle 5 can be tilted about its longitudinal axis, thereby enabling ergonomic access to the vehicle underbody. During this process, the support elements 4 adapt themselves to the vehicle body tilted about the longitudinal axis.

In addition to the positions of the lifting apparatuses 3 and support elements 4 illustrated in the figures, in other further positions are possible in accordance with other contemplated embodiments, without space-consuming support structures for overhead conveyors being required in a vehicle assembly hall. Consequently, an introduction of a load into the superstructure of the vehicle assembly hall does not occur, which can also have a comparatively low physical design or height. Moreover, high plant availability is achieved by the reduced complexity of a manufacturing plant due to a uniform, continuously realized conveying technology concept. In addition, a uniform conveying technology concept can be achieved in a modular construction. As a result, simple and rapid manufacturing plant development can be obtained, which can also easily be adapted to new objectives. As a result, a vehicle assembly plant can be realized in a much more cost-effective manner. Early specification of assembly contents of individual workstations can further be avoided.

Moreover, the present disclosed embodiments of the present conveying technology concept make it possible to avoid relative movement between the conveying devices and workers in the workstations, in contrast in particular to conventional overhead conveying technology. As a result, a high level of safety can be achieved in comparison to the levels of safety that is provided by conventional conveying technology concepts.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A transporting apparatus for a vehicle assembly plant, comprising:
   a base element displaceable on a transporting plane; and
   a plurality of pedestal elements connected to said base element, each of said plural pedestal elements being rotatable about a rotational axis perpendicular to the transporting plane, each of said plural pedestal elements being connected to a respective support element configured to hold a vehicle body, each of said respective support elements being moveable eccentrically with respect to the rotational axis of said each of said plural pedestal elements;
   wherein each of said plural pedestal elements is connected to a respective lifting apparatus, and said respective support elements connected to said each said plural pedestal elements are moveable by said respective lift apparatuses parallel to the rotational axis of said each plural pedestal elements.

2. The transporting apparatus as claimed in claim 1, wherein each said respective lifting apparatuses comprises a telescopic mechanism.

3. The transporting apparatus as claimed in claim 2, wherein each of said telescopic mechanisms is extended individually.

4. The transporting apparatus as claimed in claim 1, wherein each said respective lifting apparatuses comprises a spiral lifting unit.

5. The transporting apparatus as claimed in claim 1, wherein said each of said plural pedestal elements is mounted on said base element, and said respective support element of said each of said plural pedestal elements is secured on said respective lifting apparatus of said each of said plural pedestal elements.

6. The transporting apparatus as claimed in claim 5, wherein said each of said plural pedestal elements has a circular cross section, the rotational axis of said each of said plural pedestal elements extends centrally through said each of said plural pedestal elements, and said respective lifting apparatus is secured off-center on said each of said plural pedestal elements.

7. The transporting apparatus as claimed in claim 1, wherein said respective lifting apparatus is secured to said base element, and said each of said plural pedestal elements is mounted to said respective lifting apparatus, and said respective support elements are on said each of said plural pedestal elements.

8. The transporting apparatus as claimed in claim 7, wherein the rotational axis of said each of said plural pedestal elements extends off-center through said each of said plural pedestal elements.

9. The transporting apparatus as claimed in claim 7, wherein each of said respective support elements is integrally formed on a respective one of said plural pedestal elements.

10. The transporting apparatus as claimed in claim 1, wherein said each of said plural pedestal elements is displaceable on said base element in at least one of a longitudinal direction and a transverse direction of said base element.

11. The transporting apparatus as claimed in claim 1, wherein said base element is a vehicle steerable by remote control.

12. The transporting apparatus as claimed in claim 1, wherein said base element is a rail-guided vehicle.

13. The transporting apparatus as claimed in claim 1, wherein said respective support element is exchangeable.

14. The transporting apparatus as claimed in claim 1, wherein said respective support element is adaptable to a vehicle body tilted about a longitudinal axis of the vehicle.

* * * * *